(12) United States Patent
Sweet (10) Patent No.: US 7,044,398 B2
(45) Date of Patent: May 16, 2006

(54) INTEGRATED FIXTURE FOR TRANSFERRING HEAT BETWEEN HIGHER AND LOWER-TEMPERATURE LOOPS IN A HYDRONIC HEATING SYSTEM

(75) Inventor: David E. Sweet, Old Saybrook, CT (US)

(73) Assignee: Taco Inc., Cranston, RI (US)

( * ) Notice: Subject to any disclaimer, the term of this patent is extended or adjusted under 35 U.S.C. 154(b) by 25 days.

(21) Appl. No.: 10/899,837

(22) Filed: Jul. 26, 2004

(65) Prior Publication Data

US 2006/0016903 A1    Jan. 26, 2006

(51) Int. Cl.
*F24F 19/02* (2006.01)

(52) U.S. Cl. ............................ 237/69; 165/171; 165/56

(58) Field of Classification Search ................. 237/69, 237/43; 165/56, 49, 171; 454/185
See application file for complete search history.

(56) References Cited

U.S. PATENT DOCUMENTS

| | | | | |
|---|---|---|---|---|
| 2,784,945 | A | * 3/1957 | Fodor | ........................ 165/247 |
| 3,939,905 | A | * 2/1976 | Gettmann | ..................... 165/49 |
| 4,019,681 | A | 4/1977 | Dumser et al. | ............... 237/63 |
| 5,643,482 | A | * 7/1997 | Sandelman et al. | ......... 219/497 |
| 6,126,081 | A | * 10/2000 | Calvin et al. | .......... 237/12.3 B |

FOREIGN PATENT DOCUMENTS

| DE | 100 08 913 A1 | 9/2000 |
|---|---|---|
| EP | 0 507 104 A | 10/1992 |
| EP | 0 810 406 A2 | 12/1997 |
| GB | 122 509 A | 2/1971 |

OTHER PUBLICATIONS

European Search Report from a counterpart application.

* cited by examiner

*Primary Examiner*—Derek S. Boles
(74) *Attorney, Agent, or Firm*—Fish & Richardson P.C.

(57) ABSTRACT

An integrated fixture for transferring heat from a higher-temperature loop to a lower-temperature loop (e.g., in radiant heating, from a heating unit loop to a radiant loop). The fixture provides a heat exchanger for transferring heat from the higher-temperature loop to the lower-temperature loop. The fixture also includes a casting, in which are formed higher-temperature supply and return ports, lower-temperature supply and return ports, a higher-temperature pump volute, and a lower-temperature pump volute. Liquid from the higher-temperature loop enters the integrated fixture through the higher-temperature supply port, passes through one side of the heat exchanger, transferring heat to liquid circulating through the other side of the heat exchanger in the lower-temperature loop, and leaves the integrated fixture through the higher-temperature return port. Liquid circulating in the lower-temperature loop enters the integrated fixture through the lower-temperature return port, receives the heat from the higher temperature liquid, and leaves the integrated fixture through the lower-temperature supply port. The invention simplifies installation by integrating into one integrated fixture all four ports and both the heating unit loop pump and lower-temperature loop pump.

20 Claims, 7 Drawing Sheets

INTEGRATED FIXTURE FOR TRANSFERRING HEAT BETWEEN HIGHER AND LOWER-TEMPERATURE LOOPS IN A HYDRONIC HEATING SYSTEM

TECHNICAL FIELD

This invention relates to hydronic radiant heating systems, and in some aspects to hydronic heating.

BACKGROUND

A radiant heating system is composed of tubing embedded in flooring, walls, or ceilings of the area to be heated. Heated water is pumped through this tubing to raise the temperature of the surface (thermal mass). Heat energy radiating from the thermal mass heats the objects in the room. As the method of heat transfer in these systems is primarily radiant, lower temperature water is required to heat the thermal mass than is typically needed for convection type systems (e.g., finned tube baseboard heating). In systems where the heat source is not solely dedicated to supplying heated water to the radiant loop, a means of tempering the higher temperature water from a heating unit loop, or other type of heating unit loop, is necessary to maintain lower temperature requirements in the radiant loop. An injection loop can perform this tempering by supplying water from the heating unit loop to the radiant loop. The amount of heated water injected into the radiant loop can be set using a manually adjusted mixing valve, or using a variable speed injection pump. Alternatively, if the heating unit is a domestic hot water heater, and water from the heating unit loop may be used as potable water, the water in the heating unit loop may be isolated from the water in the radiant loop and heat may be transferred from the heating unit loop to the radiant loop via a heat exchanger.

Figure 1:
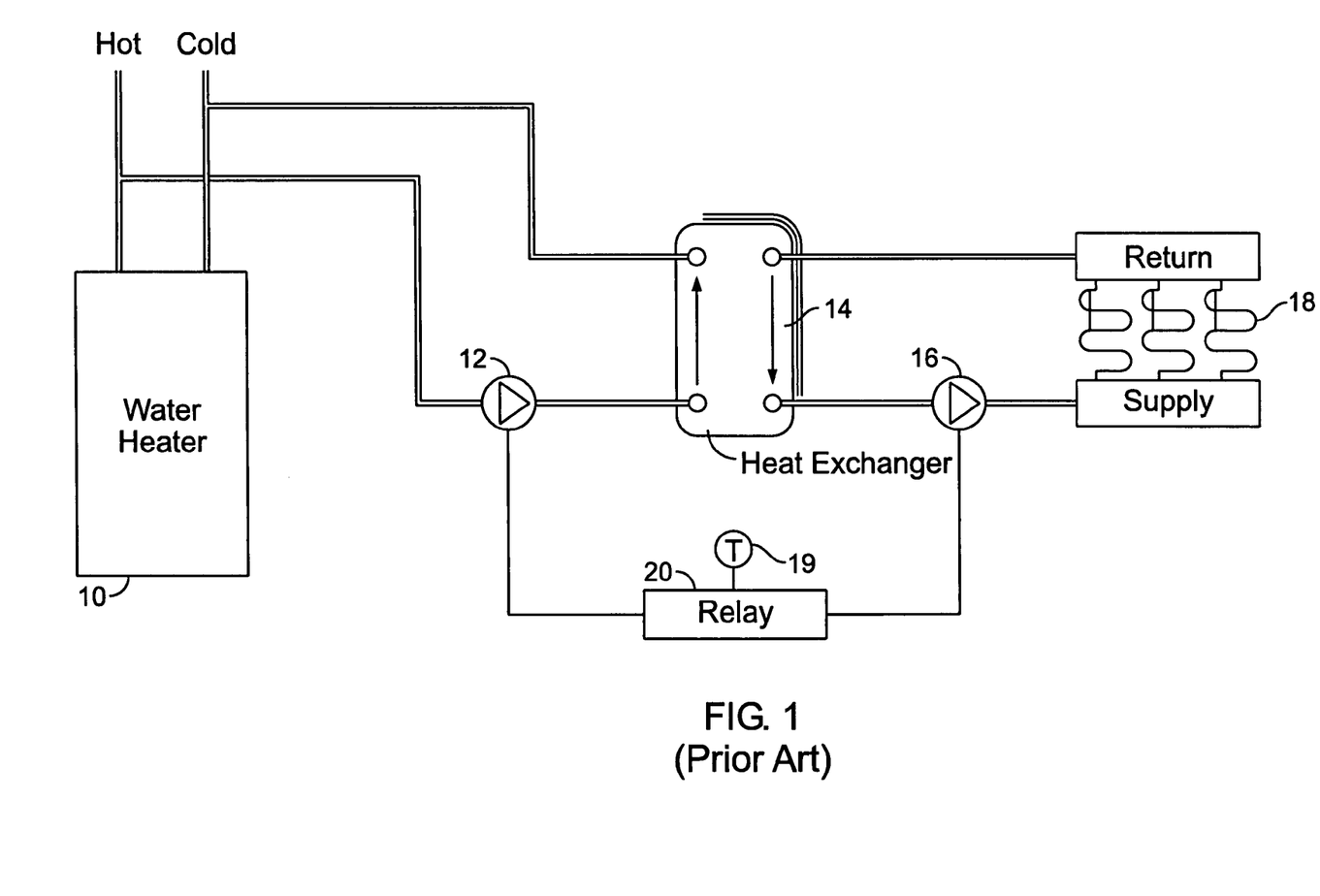
FIG. 1 is a schematic of a prior art arrangement for radiant heating.

FIG. 1 shows a prior art hydronic system of the type described above. There are two independent circulator pumps: a circulator pump 12 circulating water from the water heater 10 through the heating unit loop, and a radiant loop circulator pump 16 for circulating water through the radiant loop and thereby the coils 18 of the radiant heating system. The water in the two loops flows through two sides of a heat exchanger 14, in the directions indicated by the arrows in FIG. 1, causing heat to transfer from the water entering the heating unit loop from the outlet of the water heater, to the water returning from the radiant loop. A thermostat 19 and associated electrical circuit controls a relay 20 that switches the two circulators on.

This type of heat-exchanger-based water circulating system may also be used with other types of heat sources, e.g., a boiler, in applications in which it is desirable to separate the water in the two loops. For instance, if an antifreeze solution is used in the radiant loop, e.g., for an outdoor heated driveway or walkway, it may be desirable to isolate the water in the heating unit loop from the antifreeze solution even if the heat source is a boiler or other source that does not supply potable water.

The circulator pumps are typically of the wet rotor circulator type. The pump impeller is received in a mating cavity known as a volute. Typically, the volute is surrounded by a flange to which the pump is attached. When the pump is installed, and the impeller thereby positioned within the volute, water enters the pump through an inlet at the center of the volute, and exits through an outlet in the periphery of the volute.

SUMMARY

In general, the invention features an integrated fixture for transferring heat from a higher-temperature loop to a lower-temperature loop (e.g., in radiant heating, from a heating unit loop to a radiant loop). The fixture provides a heat exchanger for transferring heat from the higher-temperature loop to the lower-temperature loop. The fixture comprises a casting, in which are formed higher-temperature supply and return ports, lower-temperature supply and return ports, a higher-temperature pump volute, and a lower-temperature pump volute. Liquid from the higher-temperature loop enters the fixture through the higher-temperature supply port, passes through one side of the heat exchanger, transferring heat to liquid circulating through the other side of the heat exchanger in the lower-temperature loop, and leaves the fixture through the higher-temperature return port. Liquid circulating in the lower-temperature loop enters the fixture through the lower-temperature return port, receives the heat from the higher temperature liquid, and leaves the fixture through the lower-temperature supply port. The invention simplifies installation by integrating into one integrated fixture all four ports and both circulator pumps.

Preferred implementations of this aspect of the invention may incorporate one or more of the following: The integrated fixture may be for a radiant heating system, and the higher-temperature loop may be a boiler loop or a domestic water heater loop, and the lower-temperature loop may be a radiant loop. The heat exchanger may be replaceable. A check valve may be provided in the path followed by liquid traveling from the heating unit supply port to the higher-temperature circulator pump, or in the path from the higher-temperature circulator pump to the heating unit return port. The radiant loop supply and return ports may be located so that the ports are spaced apart by a distance approximating the spacing of the radiant supply and return ports on radiant heat flow manifolds. The integrated fixture may comprise a plurality of separate castings joined together, e.g., by close-fitting, mating connections sealed with O-ring type seals. The first and second portions of the casting may be in separate castings. The invention has many advantages, some of which are described in the following detailed description.

The details of one or more embodiments of the invention are set forth in the accompanying drawings and the description below. Other features and advantages of the invention will be apparent from the description and drawings, and from the claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

The descriptions below are more than sufficient for one skilled in the art to construct the disclosed implementations. Unless otherwise mentioned, the processes and manufacturing methods referred to are ones known by those working in the art.

FIGS. 2–5 show one implementation of the invention. An integrated fixture 21 (formed of bronze, plastic, or other material consistent with the applied system conditions) includes a first casting 100 defining a heating unit supply port 22 and heating unit return port 24, and a second casting 102 defining a radiant loop supply port 26 and radiant loop return port 28. Each of the ports has a threaded connection (but any of the known alternative plumbing connections, e.g., sweated, could be substituted).

Figure 4:
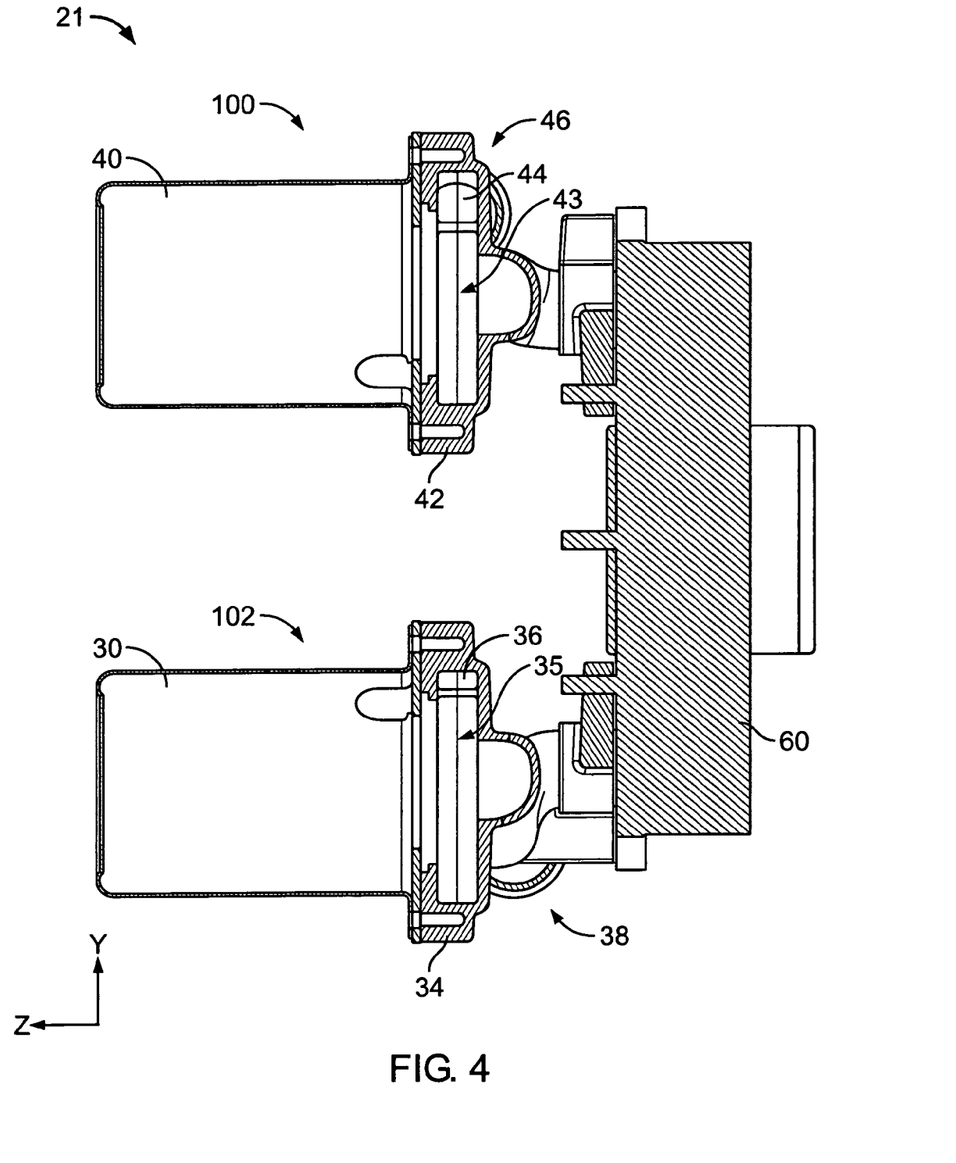
FIG. 4 is a cross-sectional view of the integrated fixture shown in FIG. 3.
Figure 5:
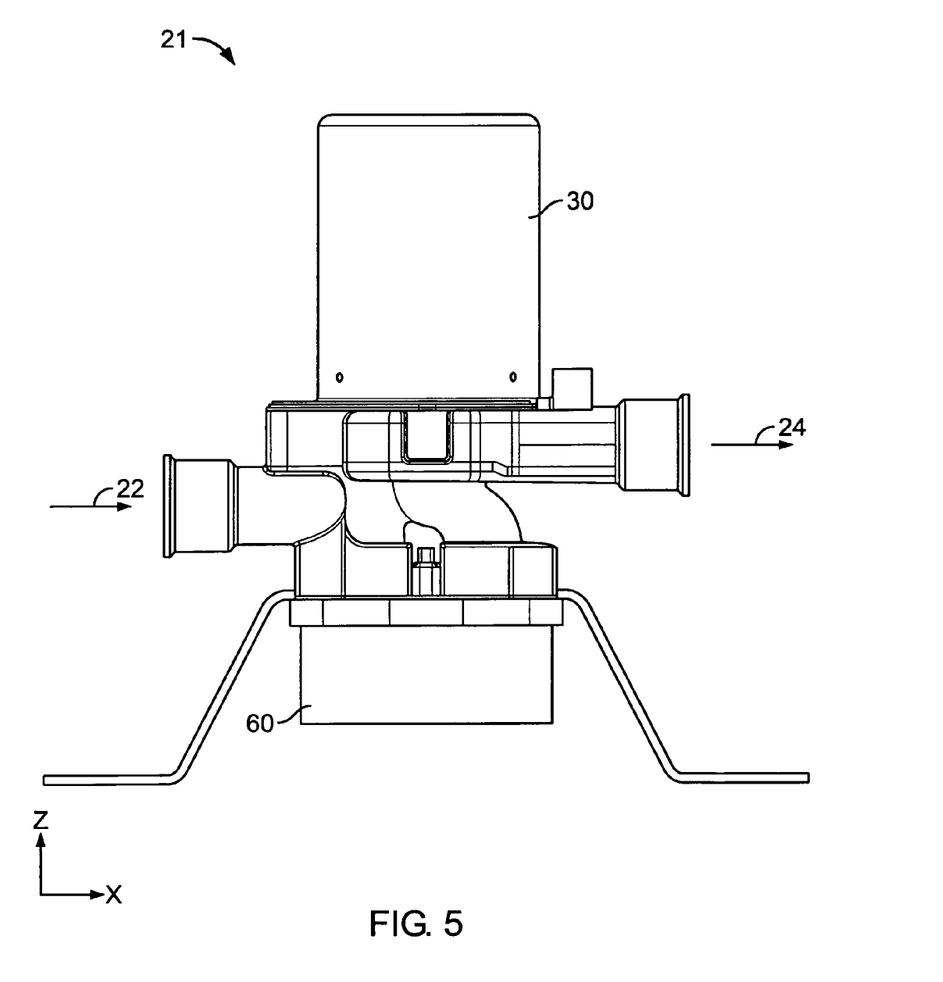
FIG. 5 is a side view of the integrated fixture shown in FIG. 3.

Referring to FIG. 4, a heating unit circulator pump 30 is bolted to flange 34 of the first casting 100. The impeller 35 of the circulator pump 30 is received in a volute 36, formed in the first casting. Liquid flows into the circulator pump 30 at inlet 38, and exits at an outlet (not shown) at the periphery of the volute. An internal passage within the casting connects the pump outlet to the heating unit return port 24.

A radiant loop circulator pump 40 is bolted to flange 42 of the second casting 102. The impeller 43 of the radiant loop pump is received in volute 44, formed in the second casting. Liquid flows into the radiant loop pump at an inlet (not shown), and exits at an outlet 46 at the periphery of the volute. An internal passage within the casting connects the pump outlet to the radiant loop supply port 26.

Water from the heating unit loop, i.e., water that has been heated by water heater 10, enters the first casting through the heating unit supply port 22, passes through one side of heat exchanger 60, and then leaves the first casting through the heating unit return port 24. At the same time, water circulating in the radiant loop enters the second casting through the radiant loop return port 28, passes through the other side of the heat exchanger, and leaves the second casting through the radiant loop supply port 26. The water in the two loops flows through the heat exchanger in opposite directions, as indicated by the arrows in FIG. 2. As the heated water flows through the heat exchanger, heat is transferred across a separating wall (not shown) of the heat exchanger to the liquid returning from the radiant loop at return port 28, heating this liquid prior to its delivery to the radiant heating coils.

As discussed above, because the two streams of water are isolated from each other within the heat exchanger, the water in the heating unit loop may be used as potable water, and the liquid in the radiant loop can contain additives or contaminants that would be unacceptable in potable water, for example antifreeze (glycols).

An electrical circuit including control circuitry for controlling the two circulator pumps is installed on the integrated fixture, and responds to input from a thermostat 19 to control the two circulator pumps.

Figure 6:
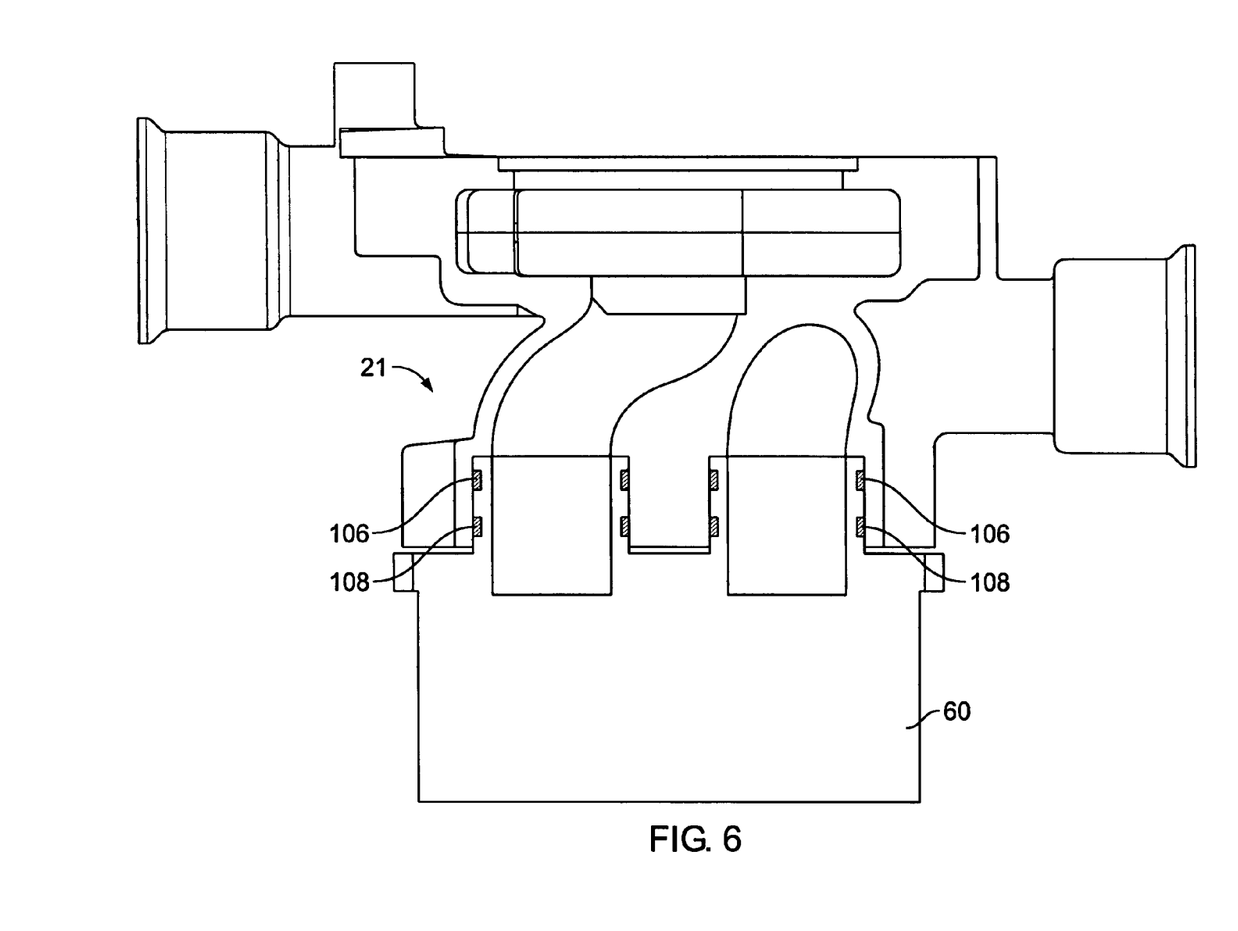
FIG. 6 is cross-sectional view of an integrated fixture showing a double sealing ring arrangement which may be used to seal between the heat exchanger and fixture.

In some preferred implementations, the heat exchanger 60 is replaceable. In the embodiment shown in FIGS. 2–5, the heat exchanger is bolted to the integrated fixture. For example, as shown in FIG. 6 a pair of sealing rings 106, 108 may be provided at each casting/heat exchanger interface to ensure a water-tight seal. The sealing rings are preferably arranged generally parallel to each other and spaced apart along the length of the interface, as shown in FIG. 6.

The spacing (pitch) between the radiant loop supply and return connections is preferably set to match the standard spacing for radiant supply and return manifolds (which supply multiple radiant loops).

Figure 3:
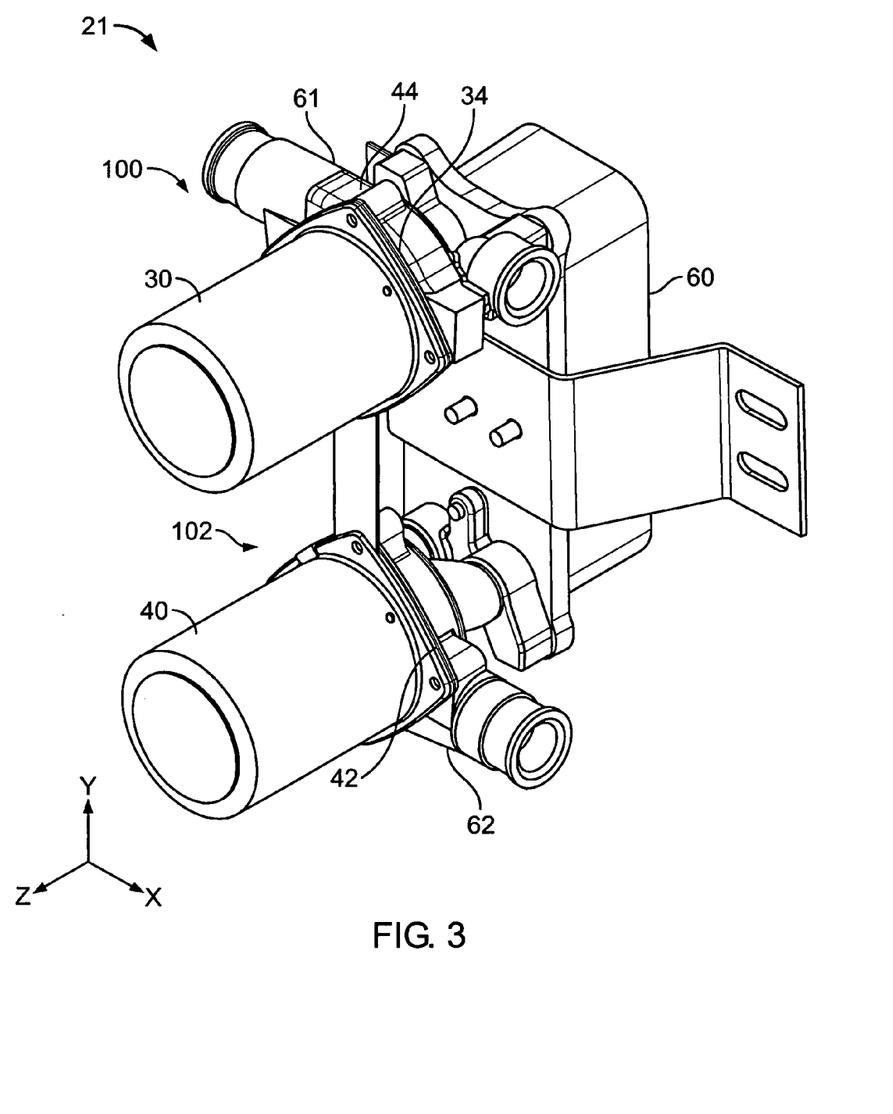
FIG. 3 is a perspective view of the integrated fixture used in the implementation of the invention shown in FIG. 2.
Figure 3A:
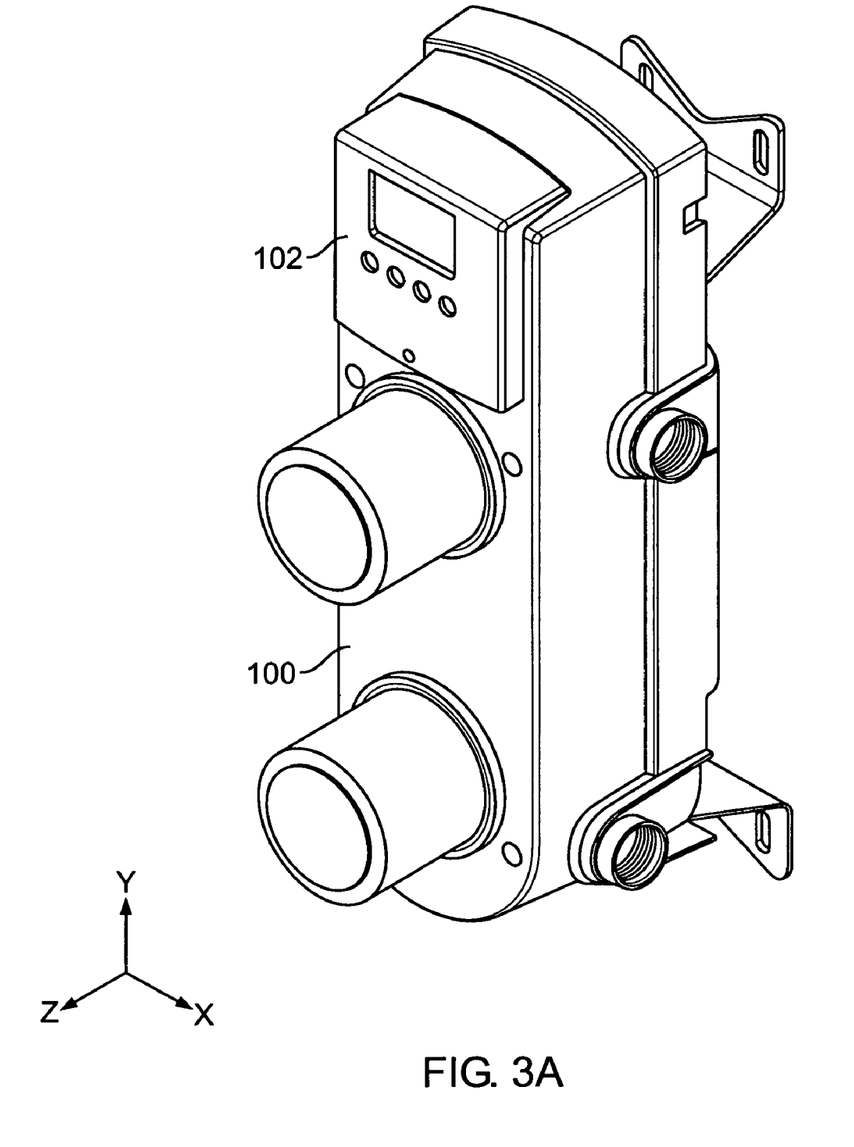
FIG. 3A is a perspective view of an integrated fixture similar to that shown in FIG. 3, disposed within a housing and ready for use.

The integrated fixture is sized and configured to permit easy mounting of the fixture to a wall panel. For example, as shown in FIG. 3A the integrated fixture may include a housing 100 and an electronic system control panel 102. The electronic system controls can be mounted in any desired location, e.g., on the pumps, the integrated fixture, or the support panel.

The integrated fixture may be comprised of a plurality of individual castings that have close-fitting, mating connections that are sealed by o-ring type seals. For example, in the implementation shown in FIGS. 3 and 4 the integrated casting is formed of three elements that are bolted together: a heat exchanger 60 (e.g., a braised plate heat exchanger) and the two individual castings 100 and 102 discussed above. Typically, bolts or other mechanical fasteners hold the plurality of individual castings together, as shown. The connections between the individual castings are not of the type used routinely for making connections between plumbing fittings in the field (e.g., sweat or threaded connections). The plurality of individual castings would be assembled at the factory and delivered to the customer as an assembled unit.

Although the implementation described above is for radiant loop heating, it is not necessary that the invention be used in radiant loop heating. It could be applied to other applications, for example, to transferring heat from a higher-temperature loop to a lower-temperature loop in a different type of heating system, for example a baseboard heating system in which different temperatures are used in different loops.

Figure 2:
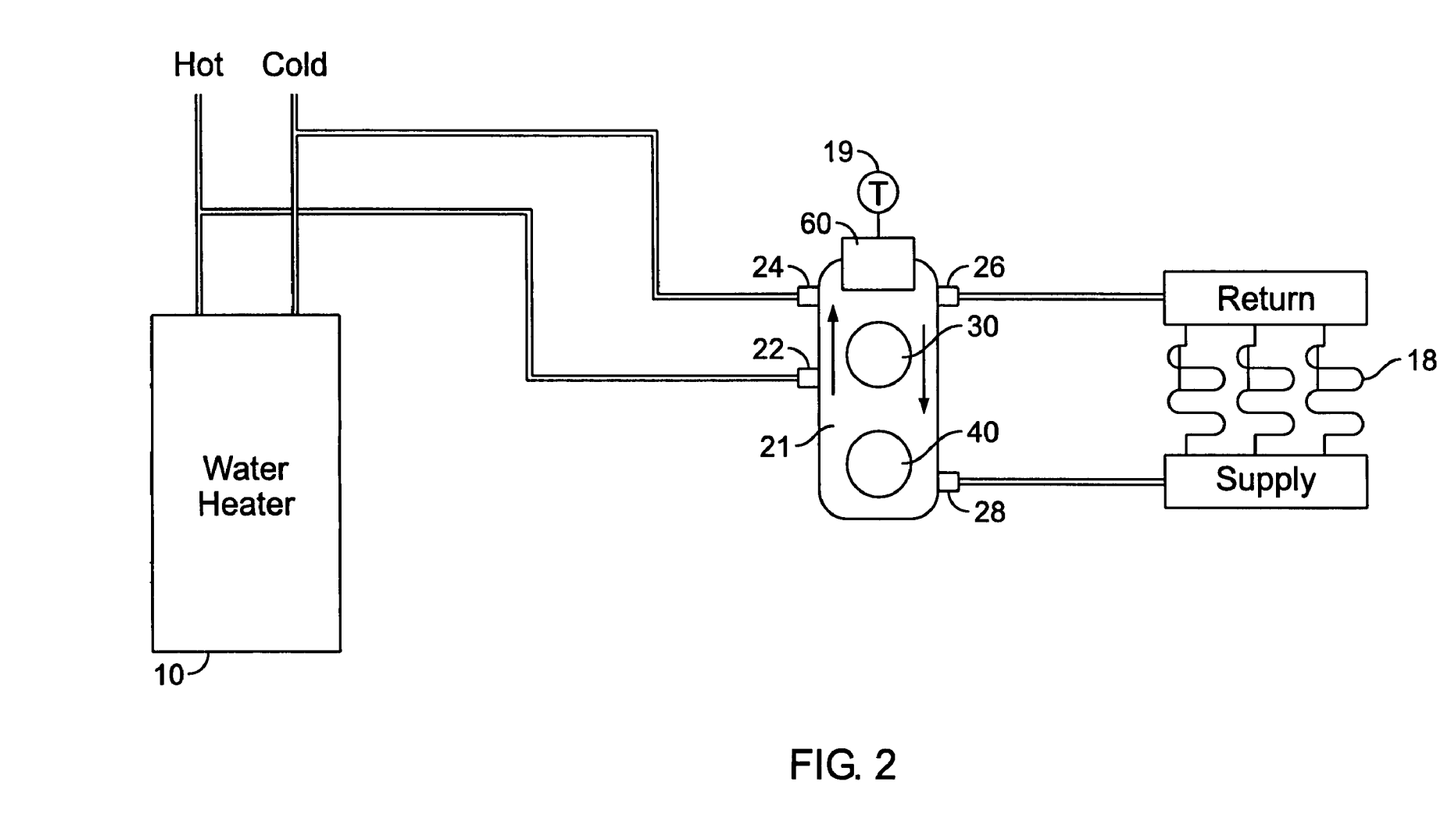
FIG. 2 is a schematic of one implementation of the invention.

Similarly, while a domestic water heater is shown as the heating unit in FIG. 2, other types of heating units may be used, such as boilers.

Instead of there being threaded pipe connections at the supply and return ports, the integrated fixture could have other types of connections (e.g., sweated, union, barbed, and grooved).

If desired, a replaceable flow-check device (not shown) may be installed in the heating unit supply port (the inlet from the heating unit loop).

Either or both of the circulator pumps may be variable speed circulator pumps. Variable speed circulator pumps may be provided, for example, to provide enhanced control over the heat delivered by the heating system. Moreover, the circulator pumps may be turned on and off in tandem or independently, depending on the requirements of a particular hydronic system.

Many other implementations of the invention other than those described above are within the invention, which is defined by the following claims.

The invention claimed is:

1. An integrated fixture for hydronic heating systems, for transferring heat from a higher-temperature loop to a lower-temperature loop, the fixture comprising:
   a casting;
   higher-temperature supply and return ports formed in a first portion of the casting;

lower-temperature supply and return ports formed in a second portion of the casting;

a higher-temperature loop pump volute formed in the first portion of the casting and configured to accept an impeller of a higher-temperature loop pump;

a lower-temperature loop pump volute formed in the second portion of the casting and configured to accept an impeller of a lower-temperature loop pump; and a heat exchanger in fluid communication with both the higher-temperature loop and the lower-temperature loop;

wherein liquid from the higher-temperature loop enters the integrated fixture through the higher-temperature supply port, passes through a first side of the heat exchanger, and leaves the integrated fixture through the higher-temperature return port, and wherein liquid circulating in the lower-temperature loop enters the integrated fixture through the lower-temperature return port, passes through a second side of the heat exchanger, receiving heat from the water in the higher-temperature loop, and leaves the integrated fixture through the lower-temperature supply port.

2. The fixture of claim 1 wherein the integrated fixture is for a radiant heating system, the higher-temperature loop is a heating unit loop, and the lower-temperature loop is a radiant loop.

3. The fixture of claim 1 further comprising a check valve in the path followed by liquid traveling from the heating unit supply port to the higher-temperature pump, or in the path from the higher-temperature pump to the heating unit return port.

4. The fixture of claim 1 further comprising an electrical circuit installed on the heat exchanger, the electrical circuit comprising control circuitry for responding to a thermostat to control the higher-temperature and lower-temperature pumps.

5. The fixture of claim 1 wherein the heat exchanger is removable from the casting.

6. The fixture of claim 1 wherein the radiant loop supply and return ports are located so that the ports are spaced apart by a distance approximating the spacing of the radiant supply and return ports on radiant heat flow manifolds.

7. The fixture of claim 1 wherein the casting comprises a plurality of castings joined together by close-fitting, mating connections sealed with O-ring type seals.

8. The fixture of claim 7 wherein the first and second casting portions are provided in separate castings.

9. The fixture of claim 1 further comprising a housing surrounding at least a portion of the casting.

10. The fixture of claim 9 further comprising an electronic control panel mounted on the housing.

11. The fixture of claim 1 further comprising a seal between the heat exchanger and the casting.

12. The fixture of claim 11 wherein the seal comprises a pair of sealing rings.

13. The fixture of claim 1 wherein the fixture is configured to isolate the higher-temperature loop and lower temperature-loop from each other.

14. A method of supplying heat to a hydronic heating system comprising:

(a) providing an integrated fixture for transferring heat from a higher-temperature loop to a lower-temperature loop, the fixture comprising:

(i) a casting;

(ii) higher-temperature supply and return ports formed in a first portion of the casting;

(iii) lower-temperature supply and return ports formed in a second portion of the casting;

(iv) a higher-temperature loop pump volute formed in the first portion of the casting and configured to accept an impeller of a higher-temperature loop pump;

(v) a lower-temperature loop pump volute formed in the second portion of the casting and configured to accept an impeller of a lower-temperature loop pump, and (vi) a heat exchanger in fluid communication with both the higher-temperature loop and the lower-temperature loop;

(b) heating liquid in the higher-temperature loop with a heating unit;

(c) delivering liquid from the higher-temperature loop to the fixture through the higher-temperature supply port, so that the liquid passes through a first side of the heat exchanger and leaves the fixture through the higher-temperature return port, and (d) delivering liquid circulating in the lower-temperature loop to the fixture through the lower-temperature return port, so that it passes through a second side of the heat exchanger, receiving heat from the water in the higher-temperature loop, and leaves the fixture through the lower-temperature supply port.

15. The method of claim 14 further comprising (e) using the liquid in the higher-temperature loop as potable water.

16. The method of claim 14 or 15 further comprising adding to the water in the lower-temperature loop an additive that would not be suitable for use in potable water.

17. The method of claim 16 wherein the additive comprises a glycol.

18. The method of claim 14 wherein step (b) is performed by a domestic hot water heater.

19. The method of claim 14 wherein step (b) is performed by a boiler.

20. The method of claim 14 further comprising the step of removing and repairing or replacing the heat exchanger.

* * * * *